March 7, 1961  N. G. L. JOHANSSON  2,973,675
SCREW VICE
Filed Aug. 10, 1959

INVENTOR.
Nils G. L. Johansson
BY Sommers + Young
Attorneys

United States Patent Office 2,973,675
Patented Mar. 7, 1961

2,973,675

SCREW VICE

Nils Gösta Lennart Johansson, Norrkoping, Sweden, assignor to Karl Einar Person, Norrkoping, Sweden Filed Aug. 10, 1959, Ser. No. 832,567

2 Claims. (Cl. 81—17)

The present invention relates to screw vices and other fixing devices of the type having jaws supported by a pair of tubes slidably engaging each other telescopically which may be locked to each other and clamped together by means of a spindle coaxially arranged with relation to the tubes, a wedgewisely slitted sleeve mounted in the outer tube, and a wedge engaging the slot of said sleeve which is movable axially with relation to the sleeve and attached to or formed integrally with a cylinder screwed onto the spindle.

According to a feature of the invention the cylinder is formed with a guide lug fitted into an axial slot formed in the inner tube with a view to permitting an axial displacement of the cylinder while preventing rotary movement thereof with relation to the tube.

The invention is illustrated in the accompanying drawing in which

Figure 1:
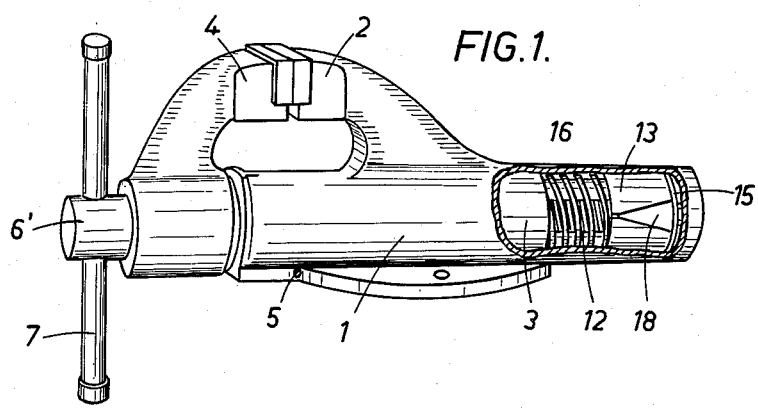
Fig. 1 is a perspective elevation of the screw vice with a portion of the outer tube thereof broken away.

With reference to the drawing, the numeral 1 designates a tube adapted to be attached to a bench (not shown). The tube 1 is formed with a jaw 2. Slidably mounted in tube 1 is an inner tube 3 carrying a jaw 4. In order to prevent the tubes 1 and 2 from rotating with relation to each other a key (not shown) attached to the inner wall of tube 1 slidably engages an axial slot formed in tube 3. Said key is locked to tube 1 by means of a rivet indicated at 5. Extending through the inner tube 3 is a spindle 6 bearing with a head 6' at its one end against the end of jaw 4. Slidably extending through a diametrical hole formed in the head 6' is a lever 7.

Figure 2:
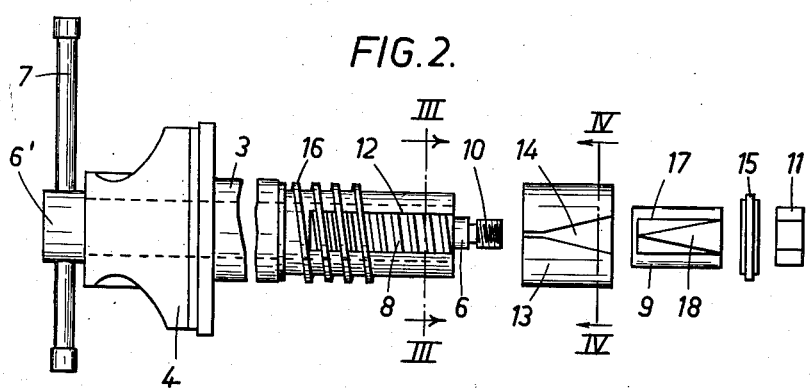
Fig. 2 is a side elevation showing one jaw and its supporting tube removed from the vice, and with some inner members axially displaced out of their normal positions.
Figure 3:
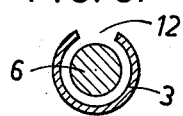
Fig. 3 is a cross section taken on the line III—III of Fig. 2.

At its opposite end the spindle 6 is formed with threads 8 for receiving an internally threaded cylinder 9 as well as with threads 10 for receiving a nut 11. The threads 8 are visible in Fig. 2 through an axial slot 12 formed in tube 3. The numeral 13 designates a sleeve having a wedge-shaped slot 14 formed therein. As will appear from Fig. 4, said sleeve may comprise two semi-cylindrical portions. The numeral 15 designates a washer and the numeral 16 designates a helical spring surrounding the inner tube 3.

The cylinder 9 is formed with a guide lug 17 dimensioned so as to fit in the slot 12. Formed integrally with said lug 17 or attached thereto is a wedge 18.

Figure 4:
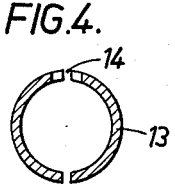
Fig. 4 is a cross section taken on the line IV—IV of Fig. 2.
Figure 5:
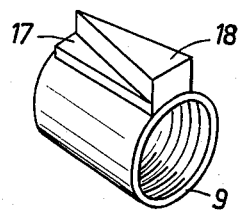
Fig. 5 is a perspective view of the cylinder and its wedge.

In order to assemble the elements shown the cylinder 9 is first brought into register with the spindle 6 with its left hand end, Fig. 5, bearing against the threaded portion 8 of the spindle and with its lug 17 in register with the slot 12. By turning the spindle 6 the cylinder 9 is caused to enter the tube 3; then the washer 15 is pushed over the end of the spindle and the nut 11 screwed onto the threaded end 10 of the spindle. The divided sleeve 13, Fig. 4, is then placed around the end of tube 3 with the wedge 18 engaging the slot 14.

If an undivided sleeve 13 is used, it is necessary to place same onto the end of the spindle prior to mounting the cylinder 9. Finally, the tube 3 with associated members is inserted into the tube 1 and locked against movement by means of the key, not shown.

By rotating the spindle in the one direction or the other the cylinder 9 with its wedge 18 may be displaced axially in order either to expand sleeve 13 against the outer tube 1 for locking purpose or to contract same for releasing purpose.

In the inactive position of the locking device the jaw 4 may be easily displaced axially. Thus the jaws 2 and 4 may be readily set for engaging work pieces of varying width with a resulting saving of time for effecting adjustment of the jaws as compared with ordinary screw vices the jaws of which are set by a screwing action.

Upon continued tightening, following the locking of the sleeve 13 to tube 1, the jaws are moved relatively towards each other to clamp the work piece therebetween by screwing the threaded spindle portion 8 into the locked cylinder 9.

I claim:

1. A device of the class specified comprising two jaws and two tubes in telescopic engagement with each other for supporting said jaws, and means for locking said tubes in desired axial positions with relation to each other, and in which said locking means comprises an expansible sleeve slidably positioned between said tubes and having walls formed with a wedge-shaped slit, an internally threaded cylinder, slidably mounted in said sleeve, a wedge-shaped member supported by said cylinder in engagement with the walls of said sleeve forming said slit for widening the sleeve to press it against the outer tube, and means for moving said cylinder axially, including an externally threaded spindle rotatably mounted in an inner tube of said two tubes and engaging by its threads into the internal threads of said cylinder; the further feature that the end portion of the inner tube is provided with walls forming a longitudinally extending slot of uniform breadth opening at the end of the tube, and that said cylinder is formed with a longitudinally extending lug of uniform breadth engaging said slot to lock the cylinder against rotation during the axial displacement thereof by rotating the spindle.

2. A device as claimed in claim 1, and in which said lug is integral with said cylinder, and the further feature that said wedge-shaped member is integral with said lug.

References Cited in the file of this patent

FOREIGN PATENTS

| 156,878 | Sweden | Nov. 6, 1956 |
| 725,900 | Great Britain | Mar. 9, 1955 |